Nov. 8, 1955 S. STELMACK 2,723,010
HILL HOLDER AND SAFETY BRAKE
Filed Oct. 23, 1952 2 Sheets-Sheet 1

INVENTOR.
Stanley Stelmack
BY Victor J. Evans
ATTORNEYS

Nov. 8, 1955 S. STELMACK 2,723,010
HILL HOLDER AND SAFETY BRAKE
Filed Oct. 23, 1952 2 Sheets-Sheet 2
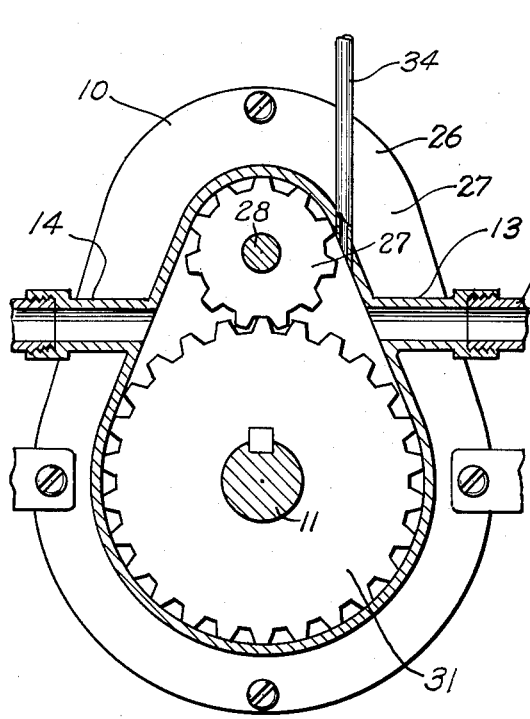
Fig. 3
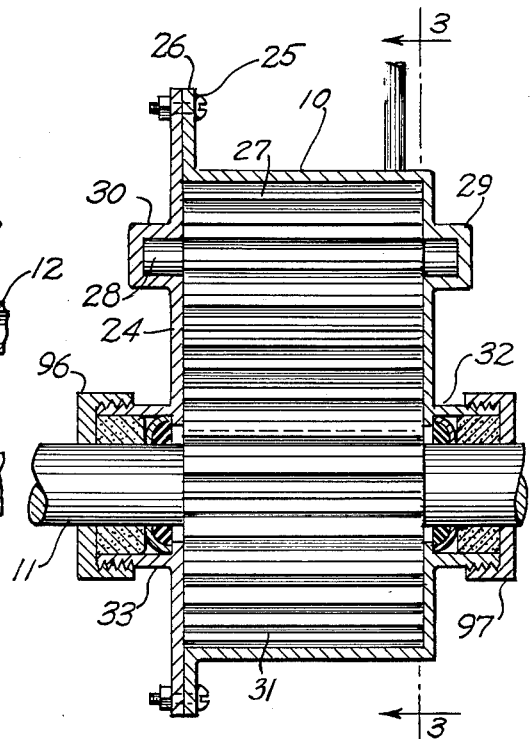
Fig. 4
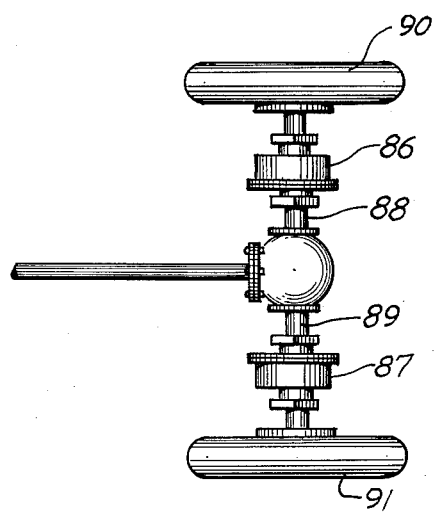
Fig. 6
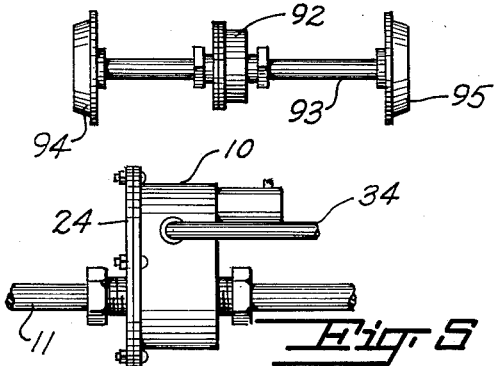
Fig. 7
Fig. 5
INVENTOR.
Stanley Stelmack
BY Victor J. Evans
ATTORNEYS United States Patent Office 2,723,010
Patented Nov. 8, 1955

2,723,010

HILL HOLDER AND SAFETY BRAKE

Stanley Stelmack, Philadelphia, Pa.

Application October 23, 1952, Serial No. 316,536

3 Claims. (Cl. 192—4)

This invention relates to safety devices used in combination with motor vehicles and in particular a hill stop or holder that is adapted to be automatically or manually actuated to hold a vehicle on a hill without using the brakes of the vehicle and with the vehicle traveling forwardly or in reverse, and in particular this invention includes a pump driving a fluid through a continuous tube leading from the discharge of the pump to the intake thereof and in which the tube is provided with a plurality of valves which are operated to stop the flow of fluid and thereby provide a brake, by the accelerator pedal, brake pedal or gear shift lever or that may also be actuated by a button or solenoid.

In numerous instances, particularly when stopping a motor vehicle in traffic on an incline it is difficult to apply the emergency brake and also in numerous instances the emergency brake is not sufficient to hold a vehicle. With this thought in mind this invention contemplates a fluid pump or brake positioned on the drive shaft or rear axle of a motor vehicle or on an axle of a railway train in which valves for retarding or stopping the flow of fluid driven by the pump stops the pump and consequently prevents movement of the vehicle.

The object of this invention is, therefore, to provide a hill holder or stop for motor vehicles and the like in which means is provided for automatically operating the device as an accelerator or foot pedal or gear shift lever is actuated and which may also be operated by a manually actuated button or other means, such as a solenoid.

Another object of the invention is to provide a hill holder or stop for motor vehicles and the like in which the device may readily be installed on vehicles now in use.

A further object of the invention is to provide an improved holding device for vehicles in which the device is of a simple and economical construction.

With these and other objects and advantages in view the invention embodies a pump, such as a gear pump, mounted on a drive shaft or axle of a vehicle with a tube having a check valve therein extended from the discharge to the intake of the pump and with valves in the tube which, when closed, prevent operation of the drive shaft and vehicle, and in which the valves are adjustably connected to accelerator and foot pedals of a vehicle, to a gear shift lever of a vehicle, and to a button and solenoid in combination on the instrument board of the vehicle.

Other features and advantages of the invention will appear from the following description taken in connection with the drawings, wherein:

Figure 4 is a longitudinal section through the pump.

Figure 5 is a plan view of the pump with the pump shown on a reduced scale.

Figure 6 is a detail showing a rear axle of a motor vehicle with one of the pumps positioned on the axle and on each side of the differential thereof.

Figure 7 is a detail showing one of the pumps mounted on an axle, which may be the axle of a railway car, trailer, or other vehicle.

Figure 8 is a fragmentary sectional view showing details of one of the valves.

Figures 1, 2, 3:
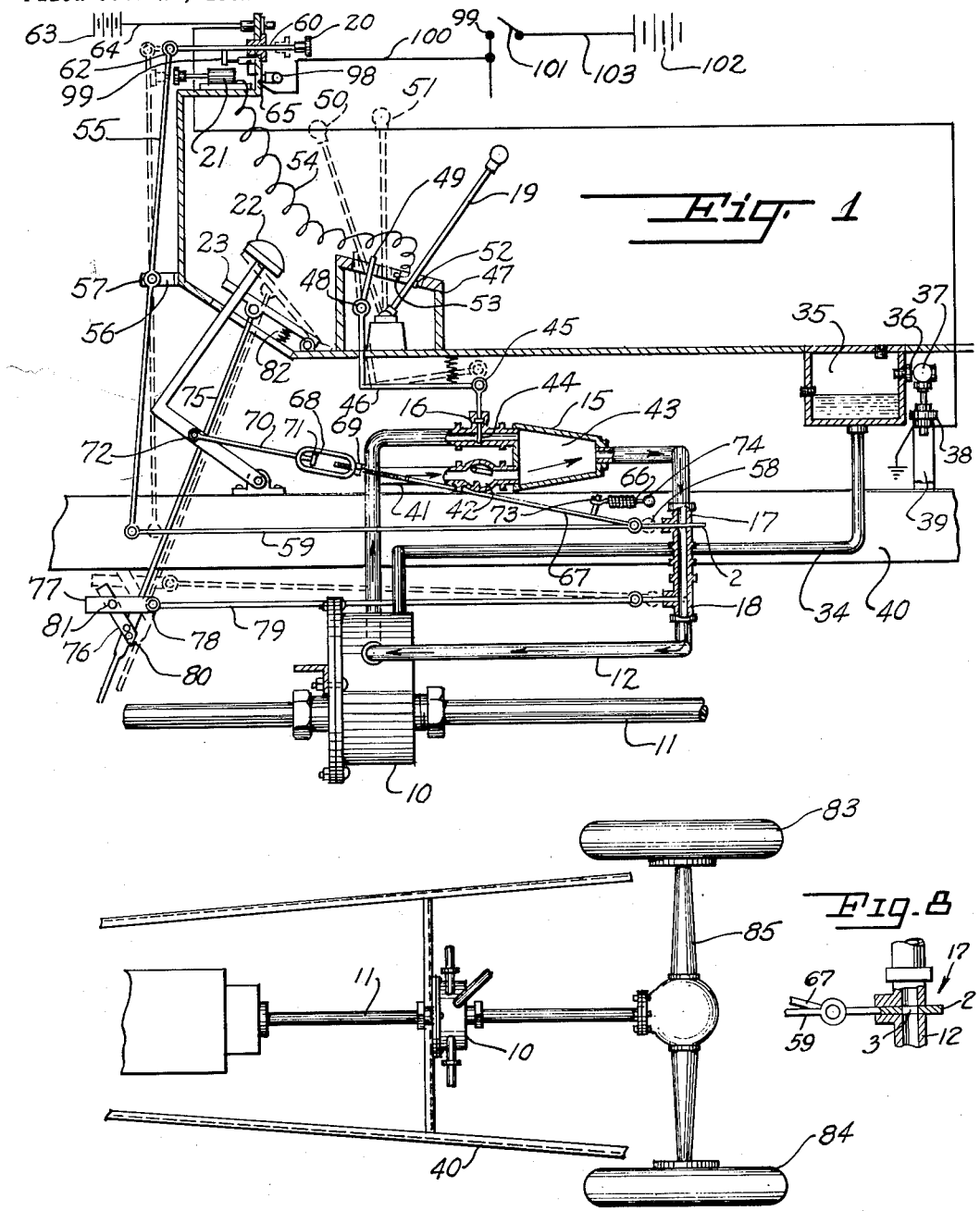
Figure 1 is a diagrammatic view illustrating a longitudinal section through part of a motor vehicle showing a pump having a continuous tube extended therefrom with the pump mounted on the drive shaft of the vehicle and with the tube provided with valves which are connected to operating elements of the vehicle.
Figure 2 is a plan view showing a portion of a chassis of a motor vehicle illustrating the position of the pump on the drive shaft of the vehicle.
Figure 3 is a cross section through the gear pump taken on line 3—3 of Fig. 4 showing the inlet and outlet connections thereof.

Referring now to the drawings wherein like reference characters denote corresponding parts the improved motor vehicle holder and safety brake of this invention includes a pump having a housing 10 mounted on a drive shaft 11 with a tube 12 extended from a discharge connection 13 to an intake connection 14 of the pump and the tube, in which a Y-connection 15 is provided is formed with valves 16, 17, and 18, the valve 16 being actuated by a gear shift lever 19 of the vehicle, the valve 17 being actuated by a button 20, or a solenoid 21, or by a foot pedal 22, and the valve 18 being actuated by the accelerator pedal 23.

As illustrated in Figs. 3 and 4 the pump, which is of the gear type, is provided with a face plate 24 that is secured to the housing 10 with bolts 25 that extend through a flange 26 on the edge of the housing and through the face plate. As shown in the drawing an upper gear 27 is mounted on a shaft 28 that is journaled in a bearing 29 in the housing at one end and a bearing 30 on the inner surface of the face plate 24, at the other.

The gear 27 meshes with a lower gear 31 that is fixedly mounted on the drive shaft 11 and the drive shaft is journaled in a bearing 32 in one side of the housing 10 and also in a bearing 33 on the face plate 24.

The pump housing is provided with a filling connection 34 that extends to a reservoir 35 and the reservoir 35 is provided with a vent 36 having a valve 37 therein, the valve 37 being actuated by a solenoid 38 for retaining the valve in the closed position. The solenoid 38 is mounted on a bracket 39 which is positioned on the frame or chassis 40 of the vehicle.

The Y or branch connection 15 of the tube 12 is used to provide a separate section 41 for a check valve 42 whereby with the valve 16 closed fluid is permitted to flow, only, in the path indicated by the arrows 43 and is not permitted to flow back to the discharge connection of the pump.

The valve member 44 of the valve 16 is pivotally connected by a pin 45 to an L-shaped arm 46 that is pivotally mounted in a gear shift housing 47 with a pin 48. The arm 46 is provided with an extension 49 that is positioned to be engaged by the gear shift lever 19 as the lever is shifted to the reverse position indicated by the dotted lines 50. The lever is shown in dotted lines in the neutral position, as indicated by the numeral 51.

The gear shift lever 19 is provided with a contact 52 that is positioned to engage a contact 53 on the housing 47 whereby a circuit is completed by a wire 54 to the solenoid 21 to close the valve 17 when the gear shift lever is in a neutral position, so that the drive shaft 11 will be locked and the vehicle held stationary. In this operation the solenoid 21 moves the upper end of a lever 55 from the position shown in full lines to the position shown in dotted lines whereby with the lever pivoted in a bracket 56 by a pin 57 the opposite end of the lever, which also moves from the position shown in full lines to that shown in dotted lines moves the valve member 58 to which a rod 59 is connected, to close the valve 17. In this movement the button 20 which is connected to the upper end of the lever 55 with a stem 60 and a pin 62 is moved inwardly to the position shown in dotted lines. By this means the button 20 may be drawn outwardly to open the valve 17 by the operator of the vehicle. The contact 52, being mounted on the gear shift lever 19 is grounded to the chassis of the vehicle and one terminal of the solenoid 21 is connected to a ground, as indicated by the numeral 63 with a wire 64 that is connected to the instrument panel as indicated by the numeral 65.

The valve 17 is such that upon application of the foot brakes of the vehicle and the foot pedal 22 is pressed downwardly the valve is closed to assist the brakes in holding the vehicle and when the foot lever is released a spring 66, which is connected to a rod 67 that extends from the valve stem of the valve 17 to the foot lever 22 opens the valve. The rod 67 is provided with a yoke 68, similar to a turn buckle, being threaded on the end of the rod 67 and held in position by a lock nut 69, and the opposite end of the yoke or turn buckle is provided with an opening through which a rod 70 extends, the rod 70 being provided with a head 71 and being pivotally connected to the foot lever 22 by a pin 72, whereby the rod is free to slide through the end of a yoke 68. By this means the valve 17 is actuated with a delayed action and, as the foot brake is first applied the head 71 slides toward the end of the socket and as the foot lever approaches the brake gripping position the head 71 contacts the end of the socket 68 and draws the rod 67 to close the valve 17. The spring 66 is attached to the rod 67 at the points 73 and to the chassis, as indicated by the numeral 40 by a pin 74.

The accelerator pedal 23 is also provided with a rod 75 that extends downwardly through the floor and chassis of the vehicle and the lower end of the rod 75 is connected to an arm 76 of a yoke 77 and the yoke is pivotally connected by a pin 78 to a rod 79 extended from the valve 18. The arm 76 is pivotally connected to the rod 75 by a pin 80 and to the yoke 77 by a pin 81.

With the device in operation oil or other liquid flows continuously, being pumped by the gear pump on the drive shaft 11, through the tube 12, the valves 42, 17 and 18 being open. Should the vehicle stop on a hill and start to roll backward the direction of flow of the oil would be reversed whereby the check valve 42 would close, stopping the vehicle.

Should the operator of the vehicle desire to drive the vehicle in reverse the reverse or gear shift lever 19 is shifted to the reverse position, as indicated by the numeral 50 whereby the levers 49 and 46 would open the valve 16 so that the fluid could continue to flow in the reverse direction.

Should the operator of the vehicle desire to slow down the vehicle in traveling down a grade it is only necessary to close the valve 17 with a button 20 or partly close the valve to retard the flow of oil through the tube whereby the vehicle is under control even though the engine may stop.

Should the car be parked on level ground and the gear shift lever 19 moved to the neutral position as indicated by the numeral 51 a circuit is completed to the solenoid 21 which will close the valve 17 so that the vehicle will be held stationary.

The valve 17 is connected by the rod 67 to the foot brake lever whereby the valve is closed as the foot brake is applied, to hold the vehicle stationary and as the foot brake lever is released the rod 67 is returned by the spring 66 to open valve 17.

The valve 18 is connected to the accelerator pedal and as the accelerator pedal is pressed downwardly to the position shown in full lines the valve 18 is opened by the levers 76 and 77 and as the pedal 23 is released the spring 82, that actuates the accelerator pedal moves the pedal upwardly with the parts moving to the positions shown in dotted lines whereby the valve 18 is closed.

As illustrated in Fig. 2 the pump 10 is mounted on the drive shaft 11 of a vehicle having a chassis 40 with rear wheels 83 and 84 on a rear axle 85, and in the design shown in Fig. 6 the pumps, as indicated by the numerals 86 and 87 are installed on sections 88 and 89, respectively of a rear axle having wheels 90 and 91.

In the design shown in Fig. 7 a pump, as indicated by the numeral 92 is positioned on an axle 93 of a railway car journal, the axle being provided with wheels 94 and 95.

It will be understood that a pump of any suitable type or design may be used and the pump will be mounted directly on the drive shaft or axle of a vehicle by suitable means. In the design shown packing glands on opposite sides of the pump are provided with locking nuts, as indicated by the numerals 96 and 97, that seal the sides of the pump housing.

The device is also provided with a warning light 98 to show that the button 20 has not been returned to the inoperative position. The warning light 98 is connected to a contact 99 with a wire 100 and as the button 20 is pulled outwardly the contact 99 engages a contact 101 which closes a circuit to a battery 102, through a wire 103. The other terminal of the battery and also the light may be connected to a common ground.

When descending a steep grade the lever or button 20 is pulled out partly closing the valve 17 to slow the vehicle down. The driver could forget to push button 20 all the way in after descending the grade so that he could be driving on the level with the main pump valve partly closed. This would cause a waste of fuel. The signal light 98 would show when the valve was closed. The spring 66 is connected to the rod 6 and to any part of the frame and the tension on this spring holds the valve 17 normally open and also prevents the brake pedal 22 from collapsing or falling down to the floor board. Therefore the valve 17 is normally open except when the brake pedal 22 is depressed. When the brake pedal 22 is depressed, it closes the valve 17.

When the foot is removed from the brake pedal the spring 66 pulls the rod 67 and opens the valve 17 and also brings the brake pedal 22 back up off the floor board. As shown in Figure 8 the valve 17 includes a movable plate 2 which is provided with an aperture or opening 3 that is mounted for movement into and out of registry with the tube 12. The aperture 3 will register with the tube 12 only when it is in the position shown in Figure 8, but when the plate 2 is moved in a direction away from the position shown in Figure 8, the valve 17 will be closed.

Although this device has been described as being particularly adapted for automobiles and railway cars, it will be understood that it may be used on all types of vehicles, such as pleasure cars, trucks and buses, trailers, passenger and freight cars in railway trains, and the like.

It will be understood that modifications, within the scope of the appended claims, may be made in the design and arrangement of the parts without departing from the spirit of the invention.

What is claimed is:

1. In combination, a vehicle, vehicle brakes, a pump, means for mounting one part of the pump on a rotatable part of the vehicle and another part of the pump on a stationary part of the vehicle, a tube extended from the discharge of said pump to the intake thereof, a valve in said tube, means connecting said valve to a brake lever of the vehicle whereby the valve is closed as the brake lever is actuated to apply brakes of the vehicle and resilient means for opening said valve upon the release of said brake lever.

2. In combination, a vehicle, vehicle brakes, a pump, means for mounting one part of the pump on a rotatable part of the vehicle and another part of the pump on a stationary part of the vehicle, said pump having an intake and a discharge, a gear shift lever mounted in the vehicle, a tube extended from the discharge of said pump to the intake thereof, a valve positioned in said tube, a brake lever mounted in the vehicle, means for connecting the valve to said brake lever whereby the valve is closed as the brake lever is actuated to apply the brakes of the vehicle, resilient means for opening said valve upon the release of said brake lever, a button positioned on the instrument panel of the vehicle, means connecting said button to the valve, a solenoid, means actuating the valve by the solenoid, and means energizing the solenoid as the gear shift lever of the vehicle is moved to a neutral position.

3. In combination, a vehicle, vehicle brakes, a pump, a rotating shaft mounted in the vehicle upon which a part of the pump is positioned, a stationary member for supporting another part of the pump, a gear shift lever mounted in the vehicle, a foot pedal mounted in the vehicle, an instrument panel also mounted in the vehicle, a tube connecting the discharge of said pump to the intake thereof, a valve in said tube, means connecting the valve to the foot lever for closing said valve as the foot lever is actuated to apply brakes of the vehicle, means for manually closing the valve, resilient means for opening the valve as the foot lever is released, means closing the valve as the gear shift lever is actuated to a neutral position, a check valve in said tube, a by-pass in the tube extended around said check valve, a valve in said by-pass, and means opening the valve in the by-pass upon movement of the gear shift lever to a reverse position.

References Cited in the file of this patent

UNITED STATES PATENTS

| Number | Name | Date |
|---|---|---|
| 1,710,032 | Price | Apr. 23, 1929 |
| 2,023,533 | Lilly | Dec. 10, 1935 |
| 2,042,539 | Maisch | June 2, 1936 |
| 2,237,301 | Freeman | June 23, 1942 |
| 2,387,716 | Chilton | Oct. 30, 1945 |
| 2,506,543 | Collins | May 2, 1950 |
| 2,521,593 | McNutt | Sept. 5, 1950 |